July 1, 1958     A. MASCARO     2,841,401
SPREADER FOR FERTILIZER AND THE LIKE

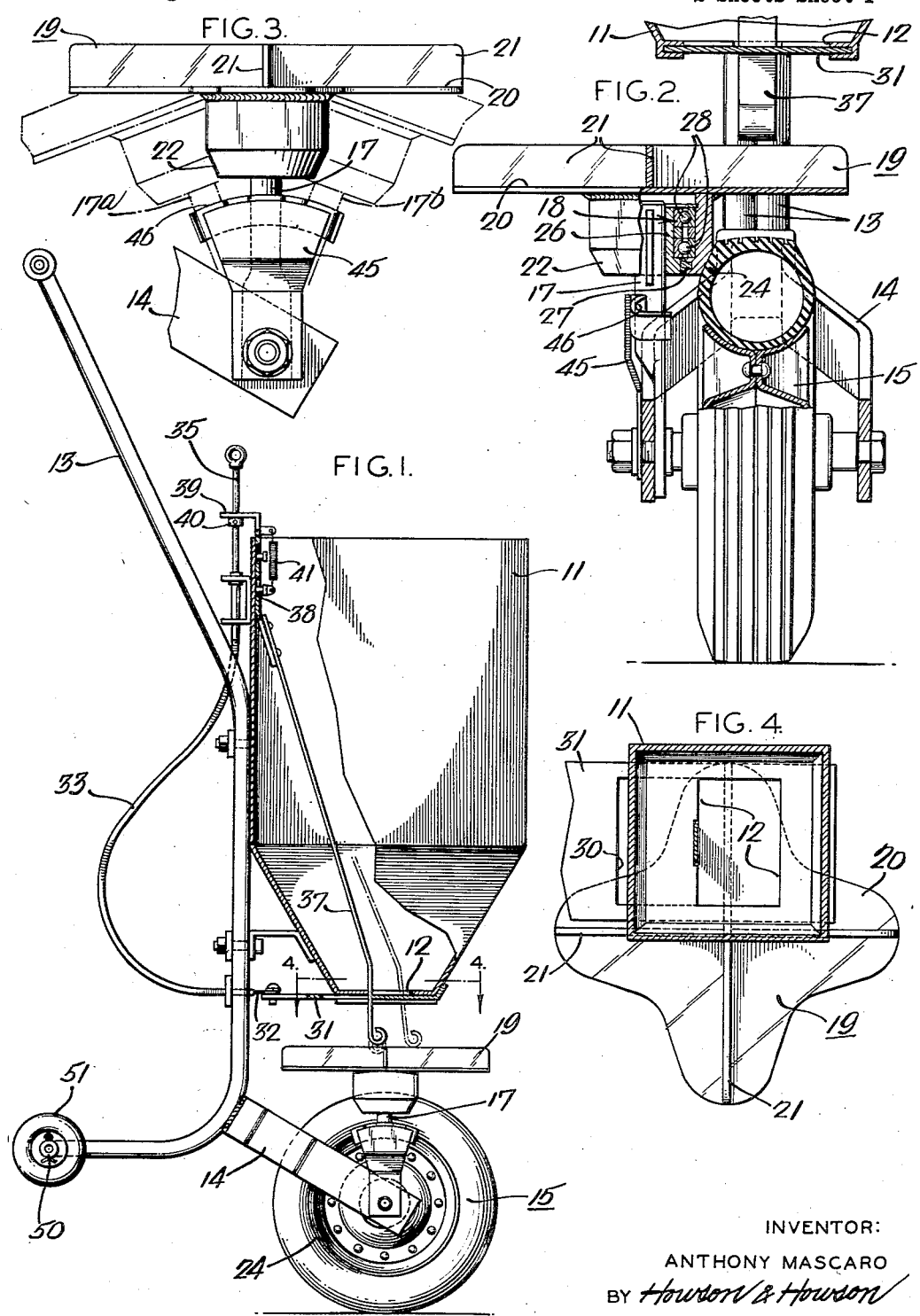

Filed Aug. 11, 1955     2 Sheets-Sheet 2

INVENTOR:
ANTHONY MASCARO
BY Howson & Howson
ATTYS.

United States Patent Office

2,841,401
Patented July 1, 1958

2,841,401

SPREADER FOR FERTILIZER AND THE LIKE

Anthony Mascaro, West Point, Pa.

Application August 11, 1955, Serial No. 527,688

1 Claim. (Cl. 275—15)

The present invention relates to spreaders for fertilizer and like granular or pulverulent materials, and more particularly to mobile units of this character which are adapted for manual operation on lawns and gardens.

A primary object of the present invention is to provide a novel mobile spreader unit which is operable to spread powdered or granular material, such as plant food and fertilizer, and distribute the same uniformly over the vegetation of a lawn or garden.

Another object of the present invention is to provide a novel device of this character which is operated automatically upon advance or forward movement of the device.

A further object of the present invention is to provide a device having the features and characteristics set forth which is of comparatively simplified and inexpensive manufacture and is fully effective in operation and use.

These and other objects of the present invention and the various features and details of the construction and operation thereof are more fully set forth hereinafter with reference to the accompanying drawing in which:

Fig. 1 is a side elevation partially in section of a spreader made in accordance with the present invention;

Fig. 2 is an enlarged fragmentary front elevation of the spreader partially in section;

Fig. 3 is an enlarged fragmentary elevation showing the adjustment of the spreading element;

Fig. 4 is a sectional view taken on the line 4—4 of Fig. 1 and showing the rotary spreading element of the device;

Figure 5:
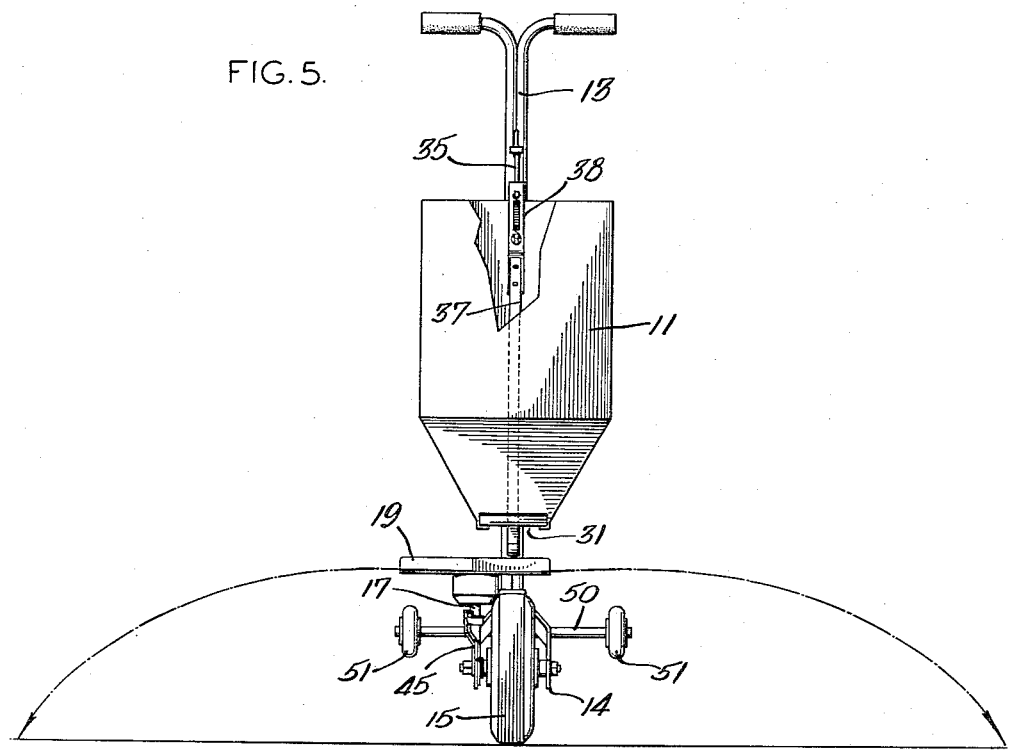
Fig. 5 is a front elevation showing the operation of the device.

The spreader of the present invention comprises a tank 11 for containing the fertilizer or other granular or pulverulent material having a lower discharge outlet at 12. The tank 11 is mounted on a handle 13 having adjacent its lower extremity a frame 14 rotatably mounting a single wheel 15. Thus, the unit may be advanced by simply pushing the device by the handle 13.

In accordance with the invention, means is provided to receive the material from the discharge outlet 12 and spread it uniformly over the vegetation of a lawn or garden. To this end, the frame 14 is provided with an upstanding stub shaft 17 having rotatably mounted thereon, for example by an anti-friction bearing assembly 18, a horizontally disposed spreader element 19. As shown in Figs. 3 and 4, the spreader element comprises a flat base 20 having a plurality, in the present instance four, upstanding vanes 21. Means is provided on the under surface of the spreader element 19 to effect rotation of the latter upon advance of the spreader unit. To this end, friction drive pulley 22, is secured to the base plate 20 in engagement with the tire portion 24 of the wheel 15. Thus, as the wheel 15 rotates on its axle, the tire portion 24 engages the pulley 22 and effects rotation of the spreader element 19 about its vertical axis.

The friction drive between the tire 24 and the pulley 22 is extremely important to insure proper operation of the spreader element 19. When dealing with fertilizer and like materials, the conventional driving elements are subject to rapid corrosion or binding of the elements by reason of the chemical and physical characteristics of the fertilizer. The powdery nature of the fertilizer frequently causes the working parts of conventional driving mechanisms to become clogged, and the corrosive chemical characteristics of the fertilizer cause rapid deterioration of exposed elements. The present invention eliminates the drawbacks of prior spreaders by providing a simple and inexpensive friction drive in which the operating parts are adequately shielded from contact with the fertilized material. Attention is directed to the bearing assembly 18 which comprises a bushing 26 slidably mounted on the shaft 17, packing 27 which mounts the lower extremity of the pulley 22 and a pair of anti-friction bearings 28, 28. The packing 27 insures against infiltration of the fertilized material into the interior of the pulley and the anti-friction bearings 28, 28, the slidable mounting of the bushing insuring engagement of the pulley 22 with the tire 24.

Means is provided to control the discharge of the fertilizer of the material from the tank 11 through the discharge opening 12. To this end, the discharge opening is provided with a laterally slidable valve element 31 which is provided with an opening 30 adapted to register with the discharge opening 12 when the spreader is operating. Operating means is provided to displace the valve element 31 out of registry with the discharge opening 12 to prevent discharge of the fertilizer onto the spreader element 19. The operating means comprises a plunger rod 32 connected to the valve element 31 at one end, and received in the bone of a flexible cable 33 at the other end. The plunger rod 32 is actuated by a rod 35 extending upwardly from the tank 11. Thus, when it is desired to cut off the flow of fertilizer from the tank 11, the rod 35 is pulled up to move the valve element 31 out of registry with the discharge opening 12. When it is desired to resume operation, the rod 35 is displaced downwardly, registering the opening 30 of the valve element 31 with the discharge opening 12.

To insure uniform flow of the fertilizer material from the hopper, an agitator is provided. In the present instance, the agitator comprises a flexible metal strip 37 slidably mounted for vertical adjustment in the hopper 11 as indicated at 38 and extending downwardly through the discharge opening 12 and the opening 30 of the valve 31 into close proximity to the spreader 19. The strip 37 is adjustable vertically, so that when the valve 31 is closed, the strip is out of contact with the vanes of the spreader element 19. However, when the valve 31 is opened to register the openings 30 and 12, the strip 37 is displaced downwardly into engagement with the vanes of the spreader element 19. Thus, when the spreader element rotates, the vanes on the element engage against the lower extremity of the strip 37, causing it to vibrate between the broken line positions shown in Fig. 1.

Displacement of the strip 37 is effected by an outturned leg 39 which embraces the rod 35. When the valve 31 is closed, by raising the rod 35, a collar 40 engages against the undersurface of the outturned leg 39 of the agitator 37, thereby raising the agitator against the bias of the spring 41 out of engagement with the spreader element 19. When the valve is opened, for example by displacing the rod 35 downwardly, the downward displacement of the collar 40 allows the spring 41 to displace the agitator element downwardly into engagement at its lower extremity with the spreader element 19. Thus, when the spreader unit is operating, the agitator 37 is in engagement with the vane 21 of the spreader element, causing the agitator element to vibrate and effect uniform flow of the material onto the spreader element 19. When the unit is rendered inoperative, for example by raising the rod 35, the agitator element 37 is displaced upwardly out of engagement with the spreader element 19. As shown in Fig. 4, the discharge opening 12 is cut out adjacent the inner edge thereof to receive the agitator element 37, as shown in Fig. 4.

It is noted that the discharge opening 12 is offset laterally from the center of the spreader element 19. Thus, the major part of the material discharged from the hopper is deposited on one side of the spreader element. Since the spreader element is rotating under the action of the wheel 15, the centrifugal force causes a distribution of the material to both sides of the spreader element and to the front, very little being distributed rearwardly since the majority of the material has been thrown off of the spreader element. This prevents the fertilized material from accumulating in the cuffs and shoes of the operator of the device (see Fig. 7).

Figure 6:
Figs. 6 and 7 are perspective views at reduced scale showing the device in use.
Figure 7:

Means is provided to adjust the spreader element to distribute the material more on one side of the unit than on the other. As shown in Figs. 1 and 3, the stub shaft 17 is mounted in engagement with a plate 45 having a series of detents 46 positioned to dispose the stub shaft with a forward, vertical, or rearward inclination. The stub shaft is pivotally mounted coaxially with the wheel 15, so that proper engagement of the pulley 22 with the tire 24 is maintained. As pointed out above, when the spreader stub shaft 17 is vertical, a uniform distribution at both sides and to the front is obtained as shown in Fig. 7. When the stub shaft is inclined rearwardly, for example as shown at 17a in Fig. 3, the major part of the material deposited on the spreader element is carried around and discharged to the right, for example as shown in Fig. 6. When the shaft 17 is inclined forwardly, for example, as indicated at 17b in Fig. 3, the material is discharged for the most part, to the left of the unit. Thus, it is possible to distribute the material to one side or the other or uniformly on both sides by simply adjusting the angularity or inclination of the stub shaft 17.

The spreader of the present invention provides a steady dispersion of the fertilizer as the unit is advanced along the ground. The device is of extremely simple manufacture, and is fully effective in operation and use. When the spreading operation is completed, the unit may be retained upright by simply lowering the handle 13, the handle being formed with a transverse rest bar 50 mounting wheels 51, 51 which are adapted to engage the ground and prevent tilting of the unit when it is at rest.

While a particular embodiment of the present invention has been herein illustrated and described, it is not intended to limit the invention to such a disclosure, and changes and modifications may be made therein and thereto without departure from the invention, as defined in the following claim.

I claim:

A mobile spreading unit comprising a tank for containing granular, pulverulent, and like material, at least one wheel supporting said tank and mounted for rotation about a substantially horizontal axis, an upright stub shaft mounted on said unit adjacent said wheel, a spreader element mounted for rotation on said shaft and comprising a substantially flat backing plate, and a plurality of upstanding vanes disposed radial to said stub shaft, means to effect rotation of said spreader elements upon advance of said unit, a discharge opening in said tank overlying said spreader unit, an agitator mounted in said tank comprising a resilient flexible strip depending downwardly through said discharge opening and displaceable vertically between a first position in engagement with the vanes whereby upon rotation of said element said strip is vibrated to effect a uniform flow of material through said discharge opening, and a second position out of engagement with said vanes, valve means in said discharge opening to afford flow of the material onto said backing plate, and an operator for said valve means movable between first and second limit positions respectively opening and closing said valve means, and connections between said strip and said operator to position the strip in its first position when the operator is in its first position and in said second position when said operator is in its second position.

References Cited in the file of this patent

UNITED STATES PATENTS

| 608,073 | Patterson | July 26, 1898 |
| 2,234,343 | Harrington | Mar. 11, 1941 |
| 2,243,939 | Arndt | June 3, 1941 |
| 2,535,414 | Heidger | Dec. 26, 1950 |
| 2,661,955 | Sherer | Dec. 8, 1953 |
| 2,687,239 | Keenan | Aug. 24, 1954 |
| 2,705,149 | Torrey | Mar. 29, 1955 |

FOREIGN PATENTS

| 257,478 | Germany | Mar. 8, 1913 |